Dec. 22, 1959    V. C. WILLIAMS ET AL    2,918,265
RECTIFICATION APPARATUS
Filed July 22, 1955    4 Sheets-Sheet 4
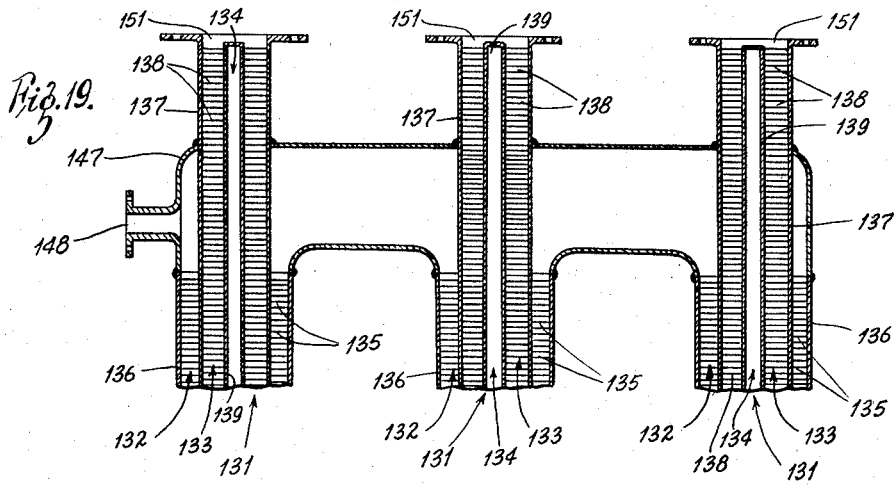
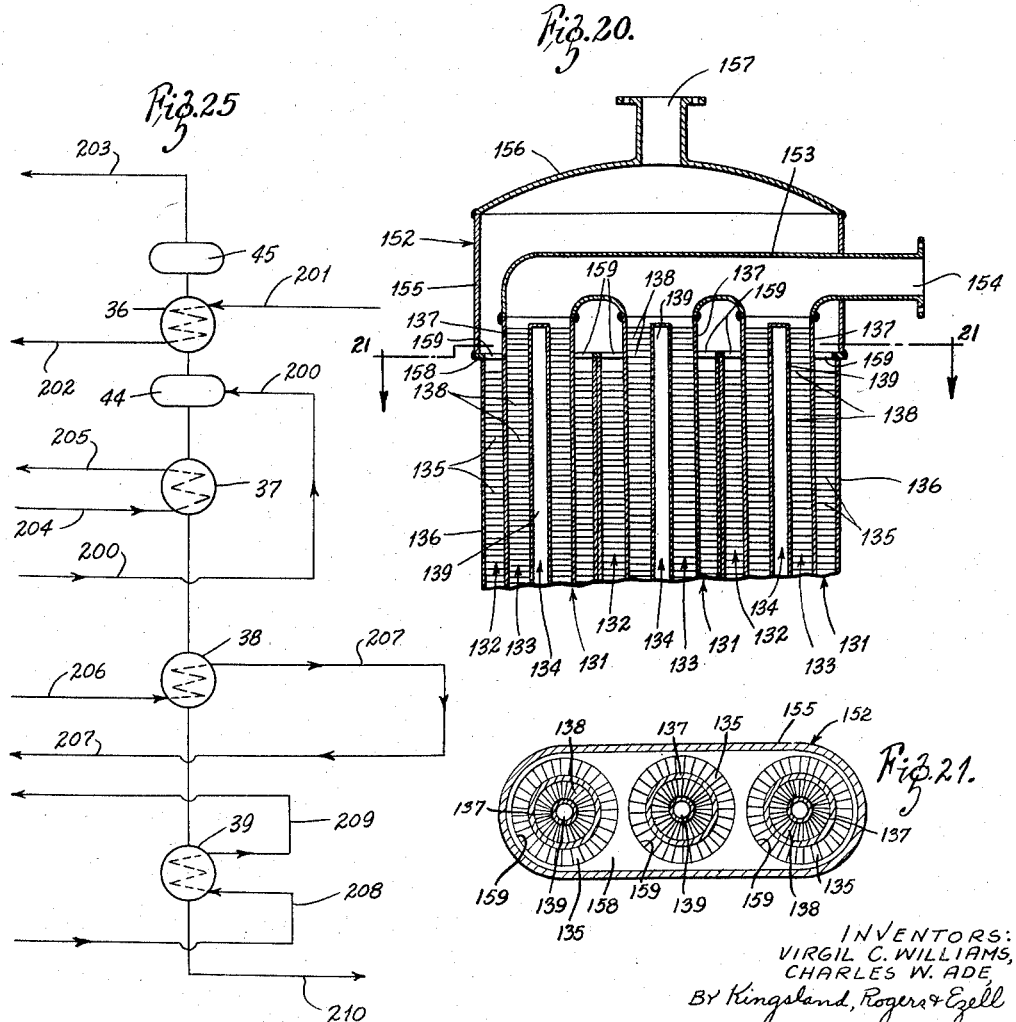
INVENTORS:
VIRGIL C. WILLIAMS,
CHARLES W. ADE
BY Kingsland, Rogers & Ezell
ATTORNEYS

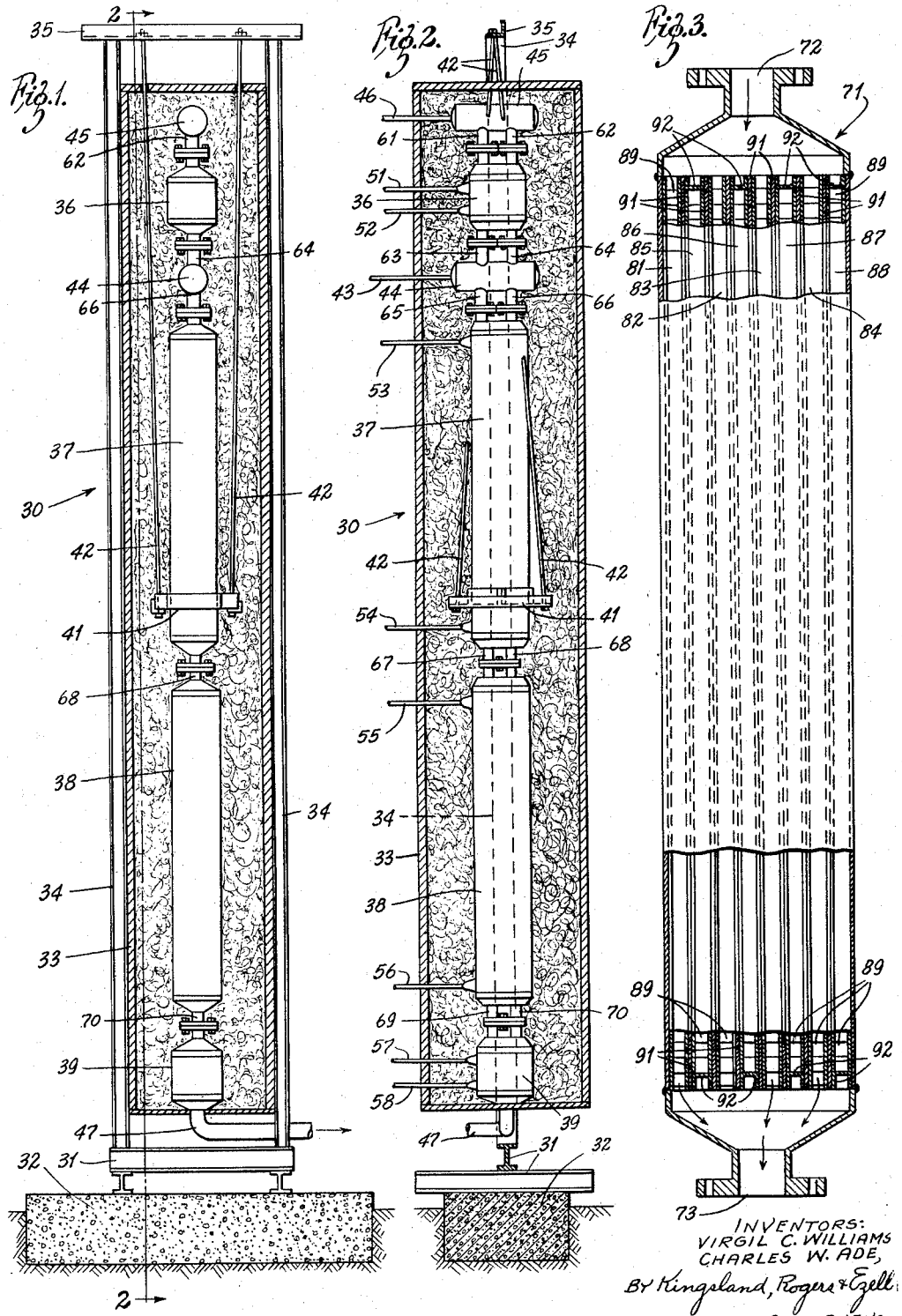

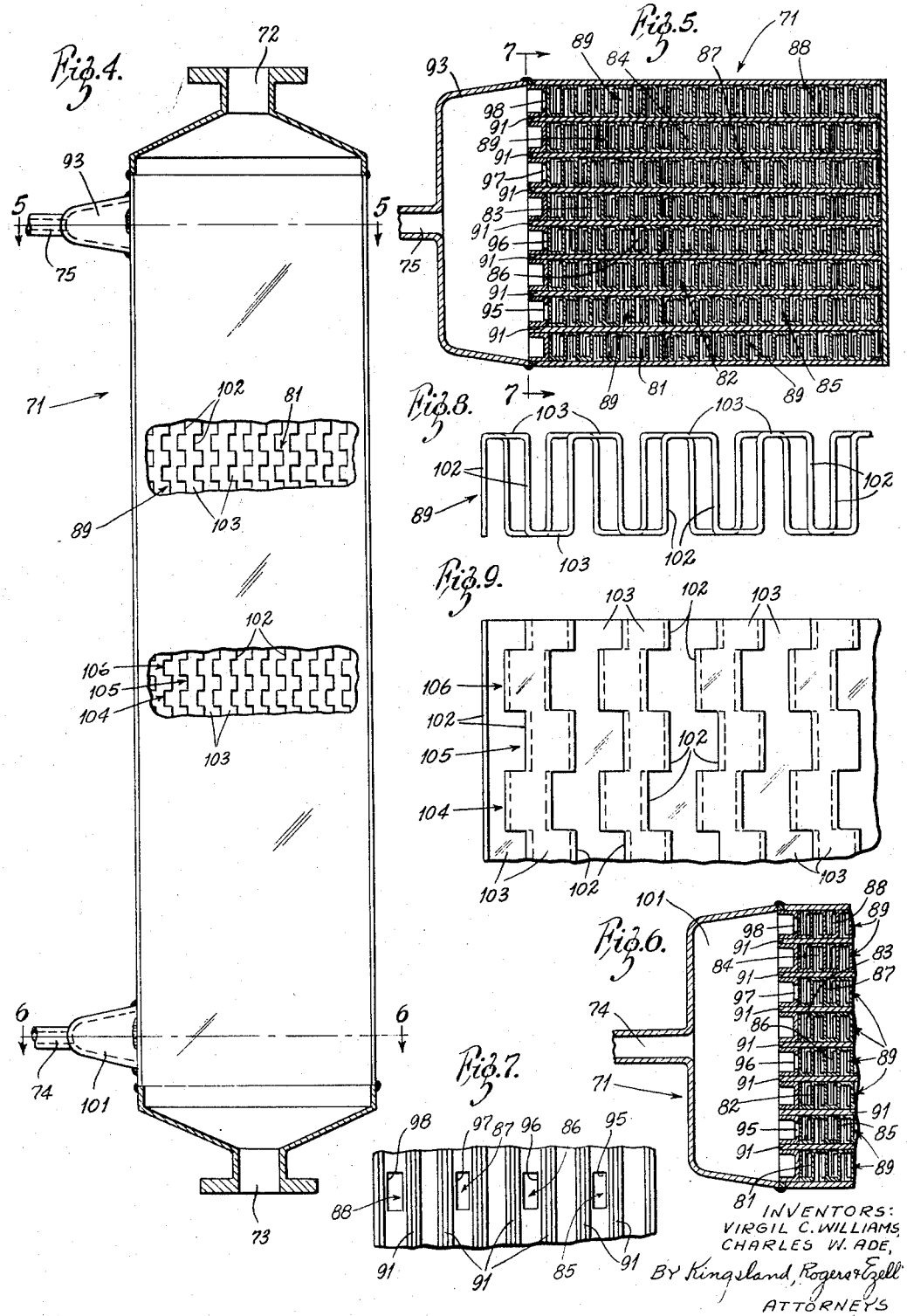

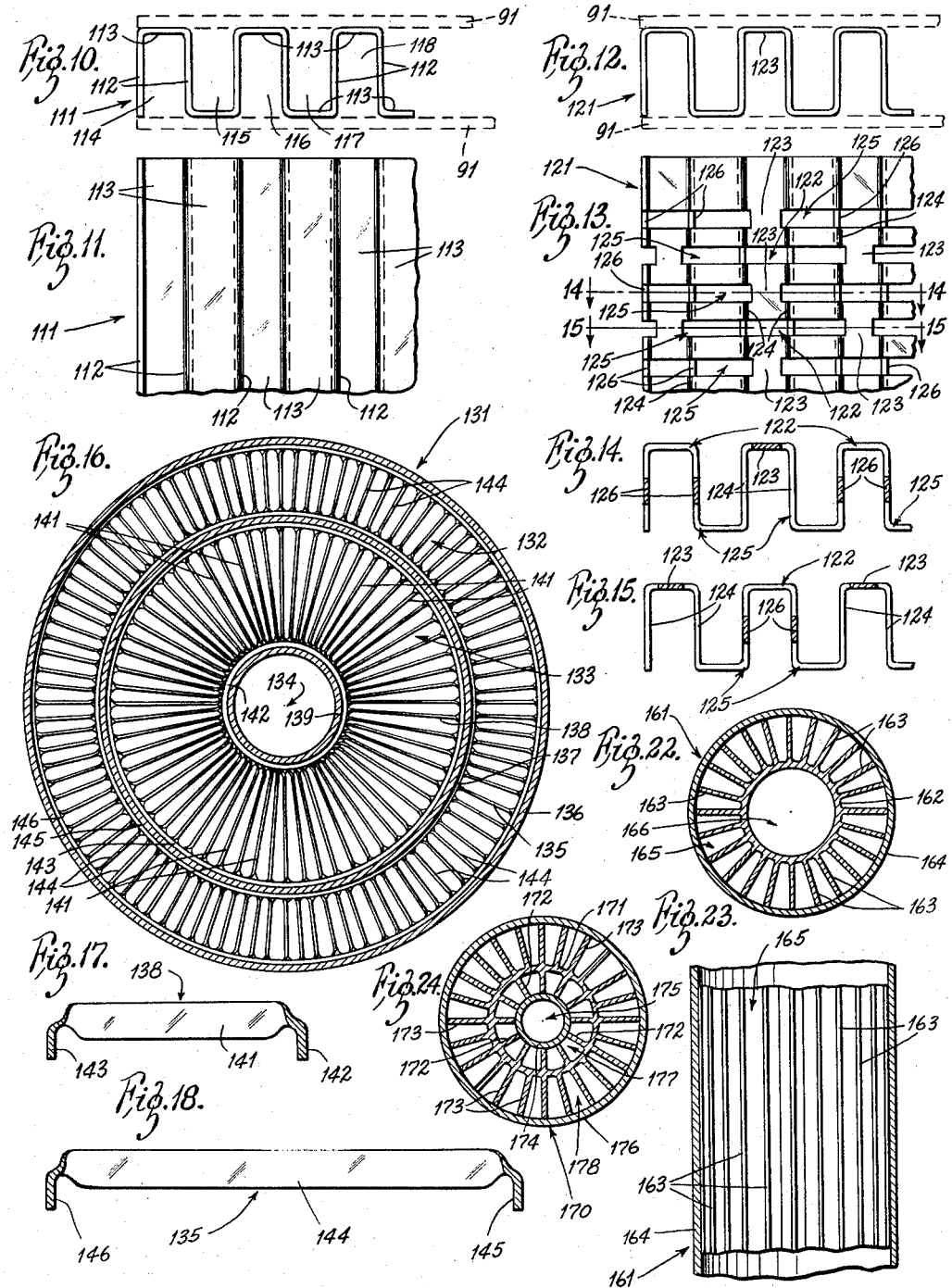

United States Patent Office 2,918,265
Patented Dec. 22, 1959

2,918,265

RECTIFICATION APPARATUS

Virgil C. Williams, Kirkwood, and Charles W. Ade, University City, Mo., assignors to Mississippi River Fuel Corporation, St. Louis, Mo., a corporation of Delaware Application July 22, 1955, Serial No. 523,782

4 Claims. (Cl. 261—9)

This invention relates to improvements in rectification apparatus, and in particular is concerned with apparatus for the separation of natural gases or other gases having boiling points appreciably differing.

This apparatus finds a particularly high utility when employed to separate natural gases in a low temperature and high pressure rectification process such as that described in the copending Williams applications, "Process for Separation of Gases," Serial No. 303,276, filed August 8, 1952, now U.S. Patent No. 2,713,780, granted July 26, 1955; and "Variable Reversible Rectification Process," Serial No. 388,145, filed October 26, 1953, now U.S. Patent No. 2,713,781, granted July 26, 1955.

In the processes of the Williams inventions, a separation is effected by approaching a reversible rectification as closely as is practically and economically possible. By reversible rectification is meant the theoretical arrangement by which a rectification column is operated so as to produce equal temperatures of vapor and liquid phases and a heat transfer medium, with heat flow between these materials being kept in minimum quantities at each level of the column. In the separation processes of the Williams applications Serial No. 303,276 and Serial No. 388,145, and in this application, the term "reversible rectification" means, practically speaking, a process in which heat abstraction or addition, by means of the heat exchange medium is performed in minimum quantities under as low a temperature driving force as is consistent with economy. The heat flow necessary in the column apparatus is supplied through a heat exchange medium which is out of contact with the material in the column to cause the liquid and vapor phases to be in substantial equilibrium at every level. This usually involves the use of a heat exchange medium that is at only a slightly different temperature from the contents of the column to provide the required driving force for the desired separation of the liquid and vapor phases.

The column apparatus of this invention is to be contrasted to conventional columns depending upon a reboiler at the bottom and a condenser at the top. In such conventional columns there is a large heat flow through a great temperature difference which involves a great entropy increase and high thermodynamic irreversibilities. These take place wherever there are high temperature differences, mixing of hot and cold liquids or vapors which occur as in pooling, which is avoided in this invention.

On the contrary, the apparatus of this invention depends upon the contact of an upwardly rising vapor with a descending film of liquid in the column. The design of the apparatus is predicated upon maintaining this physical relationship substantially throughout the column, and it is by this means that the process of separation may be successfully consummated.

The column apparatus of this invention is particularly useful in the separation of natural gas into its components or in the separation of other gas mixtures in which the components have physical characteristics similar to natural gas. Thus, where the term "natural gas" is employed in this invention, it includes cracked stocks of natural gas and the like and other fluid mixtures having substantial proportions of organic constituents as well as inorganic gas mixtures. As an example, this will include a gas mixture of 90% $H_2$ with the remaining gas consisting of CO, $C_2H_4$, $C_2H_6$, $C_3H_6$, $C_3H_8$, $CO_2$ and lesser quantities of higher hydrocarbons. Here, however, as in the case of natural gas, the mixture is characterized by the very wide temperature difference between the top of the column and the bottom of the column which is made possible because of the wide difference in boiling points between the $H_2$ as the overhead product and the other materials which are separated out as a bottoms product.

It is a special feature of this invention that the column can utilize specially designed interchange surfaces which can be used in multiples. These heat exchange surfaces insure the proper maintenance of the liquid material in the column in a film state which is in constant countercurrent contact with upwardly rising vapors. The heat exchange medium is maintained out of contact with the material to be separated and through the use of multiple units a high degree of control can be obtained to insure the proper small temperature differential and heat flow between said heat exchange medium and the column material.

Accordingly, it is an object of this invention to provide a column for the separation of gases in which said column has liquid contact surfaces for directing the liquid phase of the gas downwardly in a plurality of separate films substantially throughout the column while permitting upward flow of the vapor phase in contact with said liquid phase.

Another object of this invention is to provide a column for the separation of gases in which a plurality of substantially vertical surfaces is provided extending substantially throughout the height of the column, with said surfaces receiving a film of the liquid phase flowing in countercurrent relationship with vapor phase on one side and a heat exchange medium on the other side.

A further object of this invention is to provide a column for the separation of gases into liquid and vapor phases of differing composition in which said column has a plurality of side-by-side separate vertical chambers extending substantially continuously throughout the height of the column and means for passing a heat exchange medium on one side of the walls forming said chambers with said liquid and vapor phases being on the other side.

Still another object of this invention is to provide a column in which a gas is to be separated into a liquid phase and a vapor phase of differing composition in which vertically directed contact surfaces are employed to keep the liquid phase in a film state in a plurality of separate downwardly flowing films.

It is still another object of this invention to provide a column for the separation of gases into a liquid phase and a vapor phase of differing compositions in which the liquid is maintained in a plurality of downwardly flowing films substantially throughout the column and the heat is imparted and/or abstracted from the material in the column by a plurality of vertically extending heat exchangers which extend one above the other. Passage means are provided from the outside of the column to the portion of the heat exchangers that carry the heat exchange medium, and in this manner the heat exchange medium may be withdrawn from one vertical portion of the column and returned with either reduced or increased mass to the next vertically adjacent portion.

Still a further object of this invention is to provide a column apparatus in which a separation of gases into liquid and vapor phases may take place in a practical and economical reversible rectification process by using conventional heat exchangers in a rugged, simply constructed and easily maintained structure which is relatively inexpensive in cost.

Further objects of this invention will appear in the detailed description which follows and will be readily apparent to those skilled in the art.

Reference will now be had to the accompanying drawings showing several practical embodiments for a column structure according to this invention. These drawings and the structures typified therein are for the purpose of example only, and it is to be understood that the invention is not limited thereto.

In the drawings:

Figure 1 is a view in front elevation of the column showing the column shell in section with heat exchanger units in full lines;

Figure 2 is a view in section taken on the line 2—2 of Figure 1;

Figure 3 is an enlarged view of one of the heat exchange units in front elevation taken partially in section;

Figure 4 is a view in side elevation taken similarly to Figure 3;

Figure 5 is an enlarged sectional view of a heat exchanger unit taken on line 5—5 of Figure 4 showing an outlet and header for the heat exchange medium;

Figure 6 is an enlarged sectional view taken on the line 6—6 of Figure 4 showing another outlet and header;

Figure 7 is a view in section taken on the line 7—7 of Figure 5 showing part of the header construction;

Figure 8 is an enlarged plan view of one of the passes in the heat exchange unit;

Figure 9 is an enlarged view in front elevation of one of the passes in the heat exchange unit;

Figure 10 is an enlarged plan view of one of the passes in a slightly modified heat exchange unit;

Figure 11 is a view similar to Figure 10, but in front elevation;

Figure 12 is an enlarged plan view of a pass in another slightly modified type of heat exchange unit, and which in this view appears the same as Figure 10;

Figure 13 is a view in front elevation of the pass structure of Figure 12;

Figure 14 is a view in section taken on line 14—14 of Figure 13;

Figure 15 is a view in section taken on line 15—15 of Figure 13;

Figure 16 is a plan view in section of another modification of the heat exchange unit;

Figure 17 is an enlarged sectional view taken in elevation of one of the fins in the outer annular passage of the heat exchange unit shown in Figure 16;

Figure 18 is a view similar to Figure 17, but taken on one of the fins in the inner annular passage;

Figure 19 is a reduced view in section through the axis of one embodiment of the heat exchanger unit and header arrangement for the heat exchange element of Figure 16;

Figure 20 is a view similar to Figure 19, but showing a different modification;

Figure 21 is a view in cross-section taken on the line 21—21 of Figure 20;

Figure 22 is a plan view in section showing a further heat exchanger modification;

Figure 23 is an elevational view partially in section of the heat exchanger unit of Figure 21;

Figure 24 is a plan view in section of another heat exchanger unit; and

Figure 25 is a schematic view showing the arrangement of the flow lines and the heat exchanger units within the column.

In Figures 1 and 2, the column generally indicated at 30 is shown supported on a steel bed 31 and a concrete foundation 32. The column comprises an insulating shell 33 which is secured at its sides to girders 34 which support the shell away from the bed 31 and the concrete foundation. The girders are attached at their tops to a frame support 35.

Heat exchange units 36, 37, 38 and 39 are suspended within the shell by a pair of support plates 41 which are attached to the side of the heat exchanger 37. Tie rods 42, connecting the support plates, are fastened at their upper ends to the frame support 35.

An inlet for the raw gas to be separated into the liquid and vapor phases is provided at 43 which opens into a receiver 44 connected between the heat exchanger units 36 and 37. The top of the heat exchanger 36 opens into the bottom of an entrainment separator 45 which is provided with an outlet 46 for conducting away the separated vapor phase.

Each one of the heat exchanger units 36, 37, 38 and 39 has a top and bottom opening for the heat exchange media, and these are indicated at 51 and 52, 53 and 54, 55 and 56, and 57 and 58, respectively. The conduits between the heat exchanger units for the passage of the vapor and liquid phases of the gas to be separated are indicated at 61 and 62 between the entrainment separator 45 and the heat exchanger unit 36; 63 and 64 between the heat exchanger unit 36 and the receiver 44; 65 and 66 between the receiver 44 and the heat exchanger unit 37; 67 and 68 between the heat exchanger unit 37 and the heat exchanger unit 38; and 69 and 70 between the heat exchanger units 38 and 39.

In each instance, there are flanged connections in these conduits by means of which the units are bolted to one another and supported by the single support provided by the support plates 41. This provides for free expansion of these units within the shell which is an important consideration when the widely varying temperatures at the top and the bottom of the column are considered. The remaining interior of the shell is filled with an insulating material to prevent heat exchange with the atmosphere surrounding the shell and also to prevent undesired heat flow between different vertical regions within the column.

In Figures 3 through 9, there is shown, generally indicated at 71, one type of heat exchanger that may be utilized. This exchanger has a flanged opening 72 at the top which receives the downwardly flowing liquid phase and exhausts the upwardly rising vapors. A flanged opening 73 at the bottom exhausts the liquid phase and receives the vapor phase. For units that are used below the inlet 43 to the column, such as 37, 38 and 39, a port 74 is utilized as the entry for the heat exchange medium and the port 75 is employed as the exhaust, since the heat exchange medium must provide a driving force for the lower portion of the column which is to be heated to an increasing degree in a direction toward the bottom. Conversely, for units above the column inlet, such as the unit 36, where refrigeration is needed and the temperature decreases toward the top, the top port 75 is employed as a refrigerant inlet and the bottom port 74 is used for the exhaust.

A path for the liquid phase and vapor phase is provided in separate vertical passes 81 to 84 which are alternated with one another between passes 85 to 88, which are employed for the passage of the heat exchange medium. Partition strips 91 extend from the top of the bottom of the unit to divide and keep separate each of these passes. It is readily apparent that all of the passes 81 to 84 are open at the top and bottom for free entry and egress of the liquid and vapor phases. Each one of the passes 81 to 84 and 85 to 88, alike, are filled with a heat exchange element 89 which provide a large surface area for the liquid film to vapor contact and efficient heat exchange relationship. These elements will be more fully described below in connection with Figures 8 and 9.

The passes 85 to 88 are plugged at their tops and bottoms with channel members 92. When the unit 71 is employed as the heat exchangers 36, the heat exchange medium enters the port 75 into a header 93 as shown in Figure 5. The header is in communication with each one of the passes 85 to 88 through openings 95 to 98 and this permits the heat exchange medium to pass therethrough and descend into the unit.

At the bottom of the unit there is another header 101 which is similar in construction to that just described. This header exhausts the heat exchange medium from the passes 85 to 88 to the port 74.

The heat exchanger element 89 shown in Figures 8 and 9, as mentioned above, is employed in each pass or chamber 81 to 84 and 85 to 88. This exchanger may be constructed of aluminum, and is of a generally crimp-like configuration. However, it will be noted that these crimps comprise leg portions 102 and base portions 103 in each flight which are vertically staggered in tiers, such as shown at 104, 105 and 106 in Figure 9. This enhances vapor-liquid contact and insures efficient heat transfer which are of high importance in this invention. It will be noted also that in this structure some cross flow may be had from one side of the pass to the other which effectuates efficient heat distribution and may be desirable to obviate hot or cold spots where they might occur.

In this type of heat exchange element, as in some of the later modifications to be described in connection with Figures 12 to 15, and 16 to 18, there are generally vertically extending walls which are vertically discontinuous, i.e., they are provided with gaps or openings. This provides for hold-up of the downwardly flowing liquid phase in films and gives a wide variation in the degree of loading between the lower limit of turndown and the upper limit of flooding under which the column can operate successfully.

A modified type of heat exchange element is indicated at 111 in Figures 10 and 11. This element is also of a generally crimp-like configuration and comprises leg portions 112 and base portions 113. No cross flow, however, is possible, but a smooth even separated film flow is provided within each one of the elongated vertical passages defined by the legs and base portions and indicated at 114 to 118 in Figure 10.

Another modification of the heat exchange element is shown at 121 in Figures 12 to 15. This heat exchange element is similar to element 111 in that it is of a simple crimp-like configuration. However, cross flow within the pass is possible as in element 89, since there are two types of openings extending horizontally across the element in parallel rows. The first of these openings is designated by the arrow 122 and is cut into a base portion 123 and a portion of each of the bounding leg portions 124, as best shown in Figure 14. The second type of opening is shown by the arrow at 125 and is cut into one leg portion 124 on adjacent base portion 123 and then a lower portion of the next adjacent leg portion 126, as is also shown in Figure 14.

The arrangement of the opening in each parallel row is one opening 122 bounded on each side by two back-to-back openings 125, then another opening 122 and so on. The parallel openings are in tiers, as shown in Figures 13, 14 and 15. In each adjacent tier the openings 122 are staggered with respect to one another.

A somewhat different type of heat exchange element is generally indicated at 131 in Figures 16 to 19. This element is of a biscuit type and has an outside pass 132 and an inside pass 133 and a dead core 134. The outside element indicated at 135 is confined between an exterior tube 136 and an interior tube 137, while the inside element 138 is positioned between the interior tube 137 and a core tube 139. Both elements 135 and 138 are flat and the heat exchanger unit is constructed by placing the respective elements one upon the top of another, as is shown in Figure 19.

The inside pass heat exchange element 138 has a plurality of substantially vertical radial fins 141 and bounding concentric supports 142 and 143 which are inside and outside supports, respectively. This may be seen by considering Figure 17 as a vertical section taken on the left hand side of element 138 in Figure 16. Likewise, the outside pass heat exchange element 135 has a plurality of fins 144 bounded by concentric inside and outside supports 145 and 146, as shown in Figure 18. This figure is taken as a vertical section on the left hand side of element 135 in a manner similar to Figure 17.

In Figure 19 the heat exchange unit 131 is shown in a multiple of three inside a header 147. As shown therein, the outside elements 135 are used for the heat exchange medium, and these elements are stacked one upon another to just underneath the header port 148. The inside elements 138 are used for the passage of the vapor-liquid phase of the gas to be separated and are stacked up to the flanged outlet 151 of the tube 137. The core tube 139 is plugged at its top and bottom ends. A header 152 shown in Figures 20 and 21 may also be employed. The two embodiments here described for Figures 19 and 20 and 21 thus show means for using the heat exchange medium in the outer and inner passages of the unit, respectively. However, where desired in these heat exchange units, as also in the unit of Figure 4, the flow of the heat exchange fluid and the column unit can be used in any of the passes. In the embodiment of Figures 20 and 21 the inside pass 133 is preferably used to conduct the refrigerant heat exchange fluid through a manifold 153 leading to port 154. The outside passes 132 are enclosed in a casing 155 connected to a top 156 provided with a port 157. A tube sheet 158 is fastened to the bottom of casing 155 and the outside tubes 136 are secured to the bottom of said sheet. This sheet is provided with openings 159 which register with the inside openings of each of the exterior tubes 136.

In Figures 22 and 23 there is shown another type of heat exchanger element 161 which may be used in the casing units and headers shown in Figures 19 and 20 and 21. This element consists of a tube 162 having a plurality of integral fins 163 extending radially therefrom. A shell 164 encloses the fins to provide an outside pass 165 and an inside pass 166.

A modification of this type of element is indicated at 170 in Figure 24. In this modification, a tube 171 has integral fins 172 extending radially and interiorly, as well as exterior fins 173. A core tube 174 closes off a dead core 175 while a shell 176 encloses the element. Thus, there is provided an inside pass 177 between the core tube 174 and the tube 171, and an outside pass 178 between the tube 171 and the shell 176.

In order to provide for effective distribution of the liquid phase entering each heat exchange unit, it may be found desirable to employ a distributing agent before the liquid enters the individual chambers of the unit. For this purpose, packing material such as McMahon packing has been found to be of advantage, particularly where manifold heat exchange elements are employed.

*Operation*

The operation of the column may be readily understood by reference to Figure 25 wherein the component parts of the column 30 are shown in schematic form. As an example, a natural gas having the following analysis is treated:

| Component: | Feed to column |
|---|---|
| Nitrogen | 0.1 |
| Carbon dioxide | 1.0 |
| Methane | 92.9 |
| Ethane | 4.3 |
| Propane | 1.2 |
| N-butane | 0.21 |
| Iso-butane | 0.15 |
| Pentanes | 0.10 |
| Hexanes | 0.04 |
| Heptanes | 0.01 |
| Total | 100.0 |

This fluid gas is precooled in heat exchangers (not shown) outside of the column and charged through the conduit 200 to the column at the receiver 44. The temperature is about −133° F., which is well below the dew point of the gas at 448 p.s.i.a. and affords about 60% saturation of the gas. This precooling may be accomplished in a number of ways through heat exchange with cold streams from the column. Indirect heat exchange with portions of the feed may be employed to provide the required heat load below the column inlet for drawing off vapors from the feed gas. The overhead product, which may be further cooled in an expansion engine such as the Elliot turbo-expander, is employed as the heat exchange medium above the column inlet to provide the desired refrigeration.

The column vapors from the feed inlet in the reservoir 44 flow upwardly through the heat exchanger 36 which is cooled by the overhead product, which after further cooling enter the heat exchange unit through the conduit 201 and leave through the conduit 202. The purified overhead stream passes in vapor form from the column through the conduit 203 at −138° F. and consists of about 97% methane.

The column liquid from the feed point and heat exchanger 36 then flows downwardly through each of the heat exchange units 37, 38 and 39. Because of the design of these units, the liquid is maintained in thin films in each one of them and substantially continuously throughout the column. Each one of the heat exchange units has inlet and outlet conduits 204 and 205, 206 and 207, and 208 and 209, respectively. As mentioned previously, portions of the feed gas may be employed to supply all or part of the heat load to these units. Because of the fact that a plurality of these units are employed, a very wide degree of adaptability and control is provided since the rate of flow may be changed from one unit to another. Thus, the temperature of the heat exchange medium leaving the heat exchange unit 37 through the conduit 205 is −128° F., which is within 5° of the temperature and is within the limits of the process defined in the two previously described Williams applications.

Below the heat exchanger units there is an outlet conduit 210 from which the liquid bottoms product is withdrawn. This gas which contains ethane and all the propane and heavier fractions leaves the column at 48° F.

The separated overhead and bottoms products have the following analysis:

| Component | Overhead Product | Bottoms Product |
|---|---|---|
| Nitrogen | 0.5 | |
| Carbon dioxide | 0.8 | 6.0 |
| Methane | 97.6 | 5.8 |
| Ethane | 1.1 | 62.0 |
| Propane | | 16.9 |
| N-butane | | 4.0 |
| Iso-butane | | 3.3 |
| Pentanes | | 1.6 |
| Hexanes | | 0.31 |
| Heptanes | | 0.10 |
| Total | 100.0 | 100.0 |

As another embodiment to the basic column shown in Figures 1 and 2 multiple inlets for the feed gas vertically spaced on the column may be used for the introduction of the gas. Also, a gas may be introduced at the bottom of the column. Similarly in this modification, multiple liquid outlets vertically spaced on the column, can be employed. Further, inlets for liquids of different compositions may be added at spaced vertical points on the column. These further ports provide for operational flexibility of the column.

It is apparent that other types of heat exchange elements which provide for a film passage of the liquid phase can be used besides those which applicants have specifically described herein. Such modifications and other alterations and changes, such as are apparent to those skilled in the art, are within the scope of this invention and the claims appended hereto.

What is claimed is:

1. A column for the separation of a feed gas into a vapor and a liquid which comprises an inlet to the column for said feed gas which is vertically spaced between a vapor outlet at the top of the column and a liquid outlet at the bottom of the column, said column comprising a plurality of connected vapor-liquid contacting units, said units having generally vertically directed surface contact means extending substantially continuously from the bottom of said column up to adjacent said inlet, said surface contact means being adapted to receive an upwardly flowing vapor phase and a laterally substantially uniform downwardly flowing liquid film phase on one side of said surface contacting means, said surface contact means comprising a plurality of separate surfaces extending in separate vertical planes for receiving the liquid in separate film in downwardly flowing paths disposed in separate vertical planes, said surface contact means being substantially open on the exterior of the surfaces for the passage of upwardly flowing vapor, means for passing a heat exchange medium separately from outside the column into each of said units and withdrawing the same, passage means vertically connecting said units for confining the vapor and liquid phases wholly within the column, and means for suspending said units within the column for free expansion and contraction, said last named means comprising a support on the outside of the column and a member extending from said support freely inside the column to a supporting connection with one of said units whereby said units may move relatively to the column.

2. A column for the separation of a feed gas into a vapor and a liquid which comprises an inlet to the column for said feed gas which is vertically spaced between a vapor outlet at the top of the column and a liquid outlet at the bottom of the column, said column comprising a plurality of vapor and liquid phase contacting units, each of said units having a plurality of vertically extending passages for said liquid and vapor and contacting means therein, said contacting means comprising vertically directed and vertically discontinuous surfaces extending from the bottom portion of said unit to the top portion, said surfaces being horizontally spaced from one another in series in each of said passages and each of the individual surfaces being horizontally staggered with respect to each vertically adjacent surface, and means for passing a heat exchange medium in heat exchange relationship through each unit in heat exchange relation with each of said passages.

3. A column for the separation of a feed gas into a vapor and a liquid which comprises an inlet to the column for said feed gas which is vertically spaced between a vapor outlet at the top of the column and a liquid outlet at the bottom of the column, said column comprising a plurality of vapor and liquid phase contacting units, each of said units having a plurality of vertically extending passages for said liquid and vapor and contacting means therein, said contacting means comprising vertically directed and vertically discontinuous surfaces extending from the bottom portion of said unit to the top portion, said surfaces being horizontally spaced from one another in series in each of said passages and each of the individual surfaces being horizontally staggered with respect to each vertically adjacent surface, the discontinuous surfaces in each vertical plane being positioned with respect to the discontinuous surfaces in the next adjacent plane to present a projection of substantially continuous surfaces when viewed horizontally and to provide a tortuous horizontal path through each passage for the relatively free flow of vapor therethrough, and means for passing a heat exchange medium in heat exchange relationship through each unit in heat exchange relation with each of said passages.

4. A column for the separation of a feed gas into a vapor and a liquid which comprises an inlet to the column for said feed gas which is vertically spaced between a vapor outlet at the top of the column and a liquid outlet at the bottom of the column, said column having a plurality of vertically extending passages for said liquid and vapor and contacting means therein, said contacting means comprising vertically directed and vertically discontinuous surfaces extending from the bottom portion of said column to adjacent the inlet, said surfaces being horizontally spaced from one another in series in each of said passages and each of the individual surfaces being horizontally staggered with respect to each vertically adjacent surface, and means for passing a heat exchange medium in heat exchange relationship through the column in heat exchange relation with each of said passages.

References Cited in the file of this patent

UNITED STATES PATENTS

| | | |
|---|---|---|
| 385,504 | Colwell | July 3, 1888 |
| 1,723,425 | Jaubert | Aug. 6, 1929 |
| 2,048,179 | Chandler | July 21, 1936 |
| 2,070,100 | Twomey | Feb. 9, 1937 |
| 2,165,490 | Kranz | July 11, 1939 |
| 2,295,809 | Schuftan | Sept. 15, 1942 |
| 2,424,248 | Melvill | July 22, 1947 |
| 2,503,265 | Haynes | Apr. 11, 1950 |
| 2,532,288 | Buschow | Dec. 5, 1950 |
| 2,559,720 | Hunter | July 10, 1951 |
| 2,582,068 | Roberts | Jan. 8, 1952 |
| 2,589,262 | Keith | Mar. 18, 1952 |
| 2,602,645 | Benenati | July 8, 1952 |
| 2,643,863 | Buschow | June 30, 1953 |
| 2,656,160 | Lyerly et al. | Oct. 20, 1953 |
| 2,690,060 | Legatski | Sept. 28, 1954 |
| 2,703,226 | Simpelaar | Mar. 1, 1955 |
| 2,703,700 | Simpelaar | Mar. 28, 1955 |
| 2,782,010 | Simpelaar | Feb. 19, 1957 |

FOREIGN PATENTS

| | | |
|---|---|---|
| 574,210 | Great Britain | Dec. 27, 1945 |
| 693,926 | Germany | July 22, 1940 |